United States Patent [19]

Hartmann et al.

[11] 4,262,316
[45] Apr. 14, 1981

[54] RECORD STORAGE APPARATUS

[75] Inventors: Kurt Hartmann, Calw-Heumaden; Horst Matthaei, Waldenbuch, both of Fed. Rep. of Germany

[73] Assignee: IBM Corporation, Armonk, N.Y.

[21] Appl. No.: 61,783

[22] Filed: Jul. 30, 1979

[30] Foreign Application Priority Data

Sep. 20, 1978 [DE] Fed. Rep. of Germany ....... 2840851

[51] Int. Cl.³ .......................... G11B 5/54; G11B 5/82; G11B 25/04
[52] U.S. Cl. ..................................................... 360/99
[58] Field of Search .................................. 360/97–99, 360/86, 135; 346/137

[56] References Cited

U.S. PATENT DOCUMENTS 3,838,462  9/1974  Barbeau et al. ........................ 360/99
3,940,794  2/1976  Griffiths et al. ........................ 360/99

OTHER PUBLICATIONS

IBM Tech. Disc. Bull., B. W. McGinnis, Fast Actuator, vol. 17, No. 12, May 1975, p. 3670.

*Primary Examiner*—Alfred H. Eddleman
*Attorney, Agent, or Firm*—H. F. Somermeyer

[57] ABSTRACT

For producing a transducer access opening in a stack of rotating flexible magnetic record disks, a co-rotating part axially deflects the peripheral edges of selected disks for partially axially separating same. The co-rotating part may take the form of a thin disk, several thin disks, or shaped as a roll. The axis of the roll is obliquely inclined against the disk pack rotational axis. The roll has a resilient surface such that, after the roll has been inserted into the disk pack, the flexible disks move up the outer surface of the roll to be deflected.

6 Claims, 7 Drawing Figures

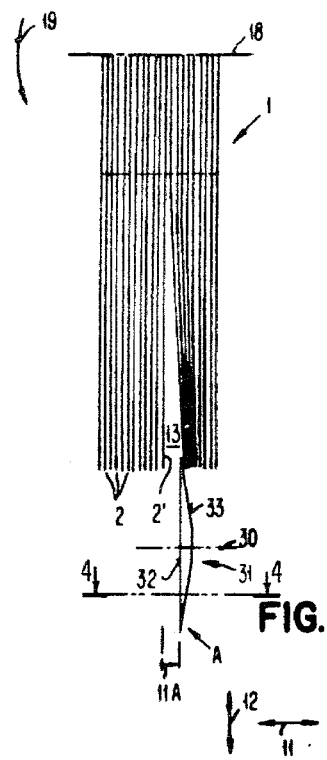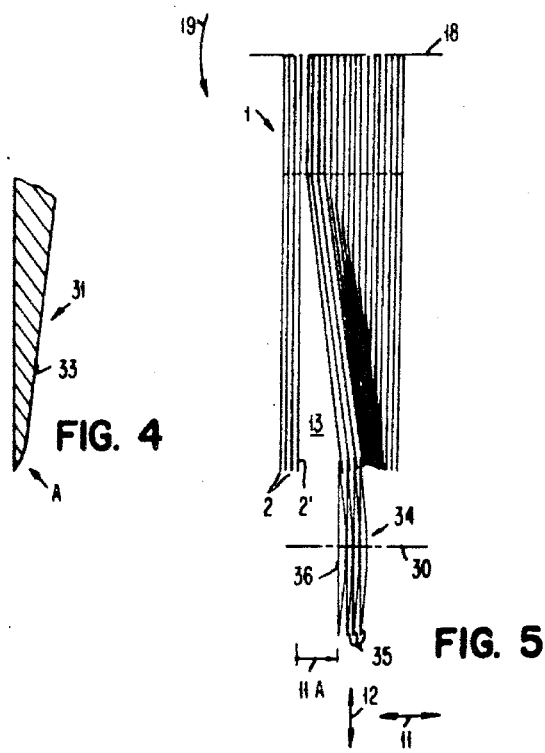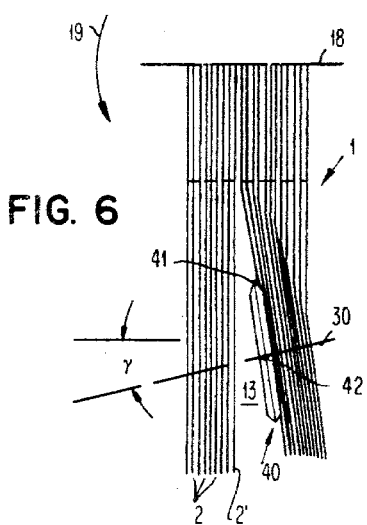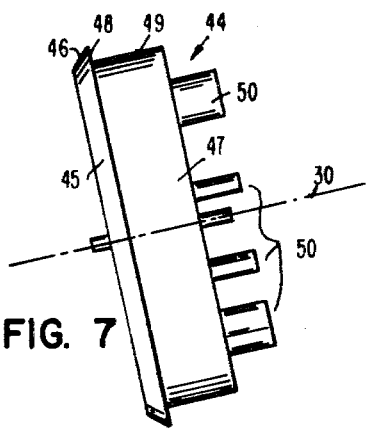

RECORD STORAGE APPARATUS

BACKGROUND OF THE INVENTION

The invention concerns an arrangement and method for spreading flexible record disks at a selected point of a rotating stack of magnetic record disks.

U.S. Pat. Nos. 3,940,794 and 3,838,462 show an arrangement for spreading a rotating pack of flexible magnetic record carriers, which consists of a partitioning blade. As the disk-shaped record carriers are closely spaced in an axial direction, in order to obtain a very space-saving data storage system with a high storage volume, the usual transducer cannot reach the record storage surfaces without spreading the flexible record carriers. Thus, it is necessary to deflect the flexible record carriers from their plane of rotation, to afford the magnetic head access and entry to the selected storage position. In known arrangements, a partitioning blade is initially radially introduced relatively deeply into the rotating pack or is inserted into the same by means of an arcuate movement, thus creating the access opening into which the transducer head is simultaneously or subsequently introduced.

Even in cases where spreading is effected with the aid of the air exiting from the partitioning blade, a partitioning blade introduced into a stack of disks invariably entails the risk of the flexible record carriers and the partitioning blade touching each other. Such unwanted contact is scarcely avoidable when a partitioning blade is introduced relatively deeply into the disk stack, particularly in the case of failures of the disk stack drive. This type of unwanted contact may lead to serious damage and destruction of the recording areas of the disk storage, not to mention the risk of the partitioning blade or the transducer being damaged.

The IBM Technical Bulletin article by B. W. McGinnis, Vol. 17, No. 12, May 1975, Page 3670 in FIGS. 6 and 7 shows producing a partial opening for accommodating a transducer. A rotating air driven wheel is inserted radially for short distances by activating a moving coil actuator. An essential feature of this separator are the points "1" in the article.

SUMMARY OF THE INVENTION

It is the object of the present invention to provide an arrangement for spreading a disk stack, whereby it is not necessary for the partitioning blade to be introduced very deeply into the disk pack. Also, the design of the partitioning means is simple, and in case the disk stack is not rotating or is rotating at a considerably reduced rotational speed, the risk of damaging the magnetic recording areas and other parts of the flexible disks and the appertaining parts is reliably avoided. In addition, contact between a stationary partitioning blade and the pack rotating at high speed and the wear this produces on the outer edges of the disks are eliminated or reduced to an acceptable minimum.

In accordance with the invention, these problems are solved in that a disk spreader has a rotating part or wheel which accesses the stack by deflecting the edges of the rotating disks. Due to the oblique relationship of the rotating wheel to the rotating flexible disks, the rotating wheel rotates such that the wheel rotates in the same direction as the disks.

This inventive solution has the advantage that potentially detrimentally high speed differences between the rotating pack and the spreader are eliminated. As a result of this special kind of disk deflection, a transducer access opening does not require a spreader, per se, to be introduced deeply into the disk pack between the disks, but it is sufficient to reach only the disk edge portions where the disks do not store signals. With regard to this inventive solution concerning the co-rotating wheel, there are shown two particularly advantageous embodiments.

One embodiment provides for a thin rigid disk or a plurality of such disks arranged adjacent to each other, which as a co-rotating wheel enables access to the stack of disks and to spread the disks at a desired axial location. A second illustrated embodiment of the inventive solution advantageously provides for a freely rotating cylindrical roll with a resilient coating exhibiting high static friction. The roll is obliquely inclined against the disk stack. On the one hand, the disks "climb" up this roll which is introduced only by a minimum radial distance into the outer circumfertial portion of the stack. The disks are axially deflected from their respective planes of rotation to produce an access opening for a transducer. Further advantageous embodiments of this invention will be seen from the following description and drawing.

The design and operation of the arrangement in accordance with the invention will be described in detail below by means of the embodiments shown in the figures.

THE DRAWING

FIG. 3 is a schematic view of a second embodiment of the invention;

FIG. 4 is an enlarged section of the disk in accordance with FIG. 3 taken along line 4—4 in the direction of the arrows;

FIG. 5 shows a set of disks which can be used in place of the individual disk of FIG. 3;

FIG. 6 shows an embodiment for introducing a corotating spreader disk to form an access opening in a stack of flexible disks; and FIG. 7 shows a further arrangement for spreading a flexible disk stack.

DETAILED DESCRIPTION

Figure 1:
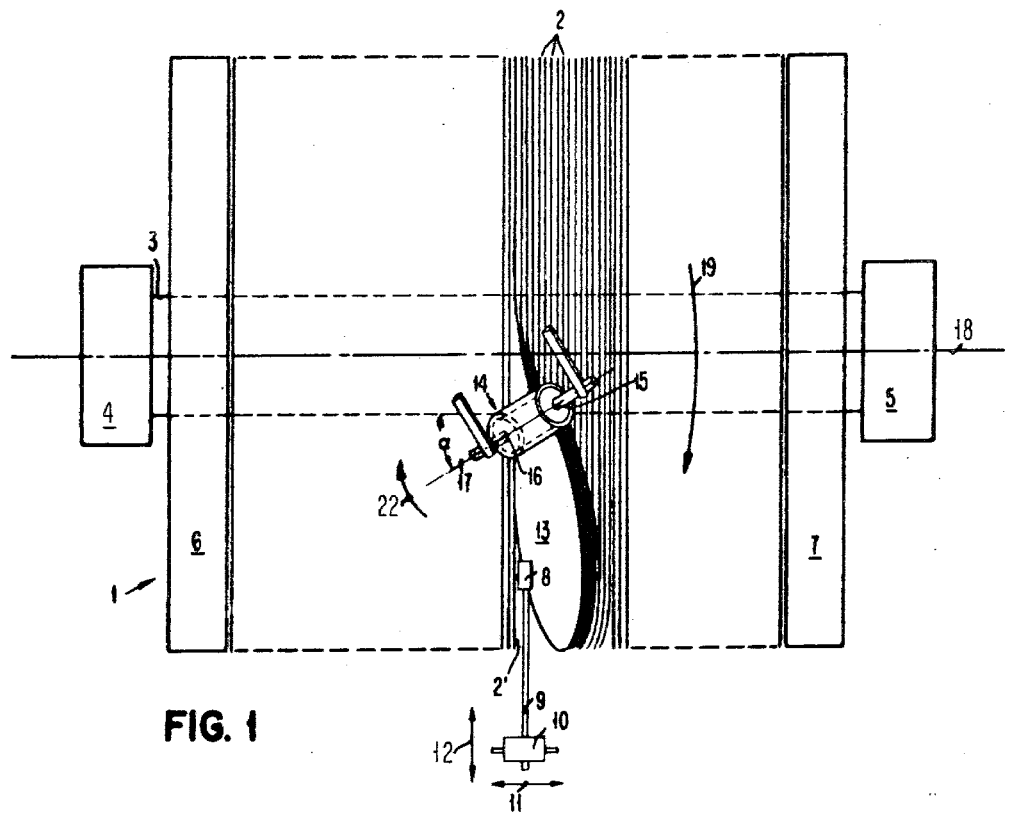
FIG. 1 is a schematic view of a disk stack with an inclined co-rotating roll or wheel used for spreading in accordance with one embodiment of the invention.

Disk stack 1 comprises a plurality of flexible co-rotating disks 2 arranged closely adjacent to each other on spindle 3. The figure shows roughly only every fifth disk. The spindle 3 is supported for rotation by bearings 4 and 5 to be driven by a drive (not shown). The area of the flexible disks 2 are stabilized on both ends by co-rotating rigid disks 6 and 7. The flexible magnetic disks 2 consist of a plastic foil coated with magnetic recording material. These flexible magnetic disks are centrally clamped to the spindle 3 at a very narrow spacing of slightly less than a 0.2 mm. center-to-center spacing. During rotation, the individual disks are tensioned and kept in one plane as a result of centrifugal forces and in particular as a result of air flowing radially outwardly through the disk stack between the individual flexible disks.

This very dense arrangement of the flexible disks ensures on the one hand a very high storage density as related to the volume, but on the other there is the problem that a magnetic transducer head which necessitates axially spreading of the disks apart. Therefore, some of the disks are deflected from their planes of rotation to provide a transducer access opening into which the magnetic head can be inserted for accessing the desired disk.

FIG. 1 also shows magnetic head 8 arranged on arm 9 which by means of an apparatus 10 can be moved parallel to the pack axis in the direction of the double arrow 11 and radially moved relative to the spindle 3 of the disk pack 1 in the direction of double arrow 12. However, head 8 can be inserted into the transducer access space 13 only when the other magnetic disks, adjacent to the disk 2' to be accessed, are axially deflected as shown.

In order to create access opening 13, the invention provides for a part 14 co-rotating with stack 1, to select the location of a desired flexible disk. During selection, the co-rotating part 14 deflects only the peripheral edges of the rotating flexible disks. The implementation shown in FIG. 1 is provided with such a part 14 takes the form of a roll or circular cylinder. Roll 14 is rotatably supported at both ends 15 and 16 such that axis 17 of roll 14 is inclined relative to axis 18 of the disk stack 1. Roll 14 is supported to rotate freely between its two ends 16 and 17, but it can also be driven. Roll 14 has a sheath and an outer coating, respectively, which is resilient and which, for interaction with the disk edges, has as a high coefficient of static friction, as high as possible.

For producing access opening 13, roll 14 in its inclined position relative to the disk pack axis 18 can be made to access the edges of the individual flexible disks. In order to select the desired flexible disk, roll 14 is initally shifted parallel to the disk pack 1 in the direction of the arrow 19. Then roll 14 moves in a radial direction towards the outer edge of the flexible disks in disk stack 1. The cylindrical surface of roll 14 only slightly intrudes into the envelope of flexible disk stack 1. Access opening 13 is obtained between the flexible disk 2' which is just beyond the edge of roll 14 initially contacting the disk stack 1 on the circumference.

Figure 2:
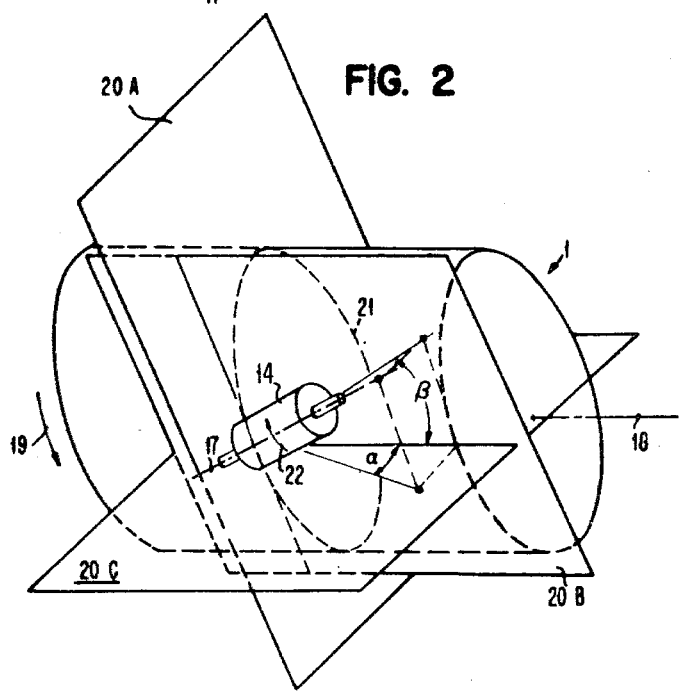
FIG. 2 is a perspective view type schematic representation of angular relations between a flexible disk stack and the roll of FIG. 1.

FIG. 2 shows the operation of roll 14 during the just described disk selection. Disk stack 1 rotates in the direction of arrow 19 at an angular speed $\omega_1$ about the axis 18. In the area of plane 20A there rotates disk 21 (marked by a broken line). Co-rotating roll 14 moves with one axial edge at plane 20A to the outer circumference or envelope of the disk stack 1. Axis 17 of roll 14 is tilted off the pack towards the outside by the climbing angle $\alpha$ to the right of the point of contact or access and which is marked by the tangent plane 20B extending parallel to the pack axis 18 and vertically to the plane 20C which is a plane parallel to the point of contact between roll 14 cylindrical surface and the axis 18 of disk stack 1. Roll 14 is tilted forward through the deflection angle $\beta$ to the right of the point of contact or access against the direction of disk stack rotation indicated by arrow 19.

Roll 14 rotates at an angular speed $\omega_2$ in the direction of the arrow 22, so that at the point where roll 14 cylindrical surface contacts or accesses the outer area of disk stack 1, the linear and the tangential speeds of both parts, i.e., of the disk pack 1 and roll 14, are of the same magnitude and direction. The high static friction of the resilient surface of roll 14 cause the disks 2 tilted through the angle of deflection $\beta$ to be deflected from their plane of rotation 20A and to "climb" onto the cylindrical surface of roll 14. The magnitude of the climbing angle $\alpha$ determines the extent of climb.

As roll 14 is inserted into disk stack 1, the disks 2 rotating at the speed $\omega_1$ cause the roll 14 (when not separately driven) to be accelerated to a speed which nearly corresponds to the speed of the disk stack at the point of contact. The contact between the flexible disk 2 edges and roll 14 is essentially a point or line contact and in such a manner that, as a result of the resilience, there is insignificant slip between the disk edge and the roll sheath. There is a flexible disk 2 edge and roll 14 quasi-interlocking. The position of the roll 14, in particular the climbing angle $\alpha$, cause the contacted flexible disks 2 to climb up roll 14 as a function of a force acting in the direction of the roll axis 17 and originating from the contact pressure between roll 14 and disk stack 1. When the rigidity of the deflected disks and the force acting in the direction of the roll axis 17 balance each other, the climbing process is completed.

The magnitude of the climbing angle $\alpha$ is about 1 to 5°, preferably about 2.5°. The magnitude of the deflection angle $\beta$ is between about 10 and 20°, preferably about 15°. The depth of penetration of roll 14 at the point of contact is very low, affecting in each case only that edge area of the flexible disks 2; in which areas generally no data are magnetically recorded. The order of magnitude of roll 14 contact with flexible disks 2 is about 1–2 mm, but this value may be a function of the kind of material of the flexible disks 2, their diameters, and of other parameters.

A disk stack designed in accordance with the invention as schematically represented in FIG. 1, uses about 500 flexible disks. The flexible disks 2 thickness amounted to about 0.075 mm. The center-to-center distance between two disks is about 0.18 mm. The rotational speed of stack 1 of about 1800 revolutions per minute, corresponds to a peripheral speed of about 18 meters per minute. The dimensions of roll 14 used for this purpose were as follows: The roll diameter was about 22 mm, roll length about 25 mm, climbing angle $\alpha$ 2.5°, the angle of deflection $\beta$ 14°, and the depth of penetration of the roll 1 mm. These dimensions permitted a maximum of access opening at the edge of 10 mm axial length and, at a depth of about 50 mm from the outer edge of the stack, a maximum gap height inside of 3.8 mm; i.e., about 60° behind the point of contact between roll 14 and stack 1.

Roll 14 may be driven to have the same tangential speed at the point of access as the disk pack 1. However, this arrangement adds costs. It is simpler and fully adequate to have a lightweight roll 14 made, for example, of aluminum, surrounded by a resilient coating of polyurethane, which has a high coefficient of static friction. As roll 14 contacts the disk stack 1, the outer edges of the disks 2 cause roll 14 to be very rapidly accelerated to a speed value corresponding to the tangential speed of the disk stack. As the outer edges of the flexible disk 12 and the resilient coating of the roll 14 are interlocking and as—apart from the initial contact—there is no slip between roll and disk edges, there is no relative movement and thus no or minimal wear. Even in the case of a reduced circumferential speed of the disk pack and even in the case of a standstill of the disk pack, roll 14 may ensure in particular cases that the disk edges adhere to it, thus preventing the access opening for the head 8 from being closed. Such advantage occurs in those cases where the plane of rotation of the stack 1 is essentially horizontally arranged, and roll 14 in the lower area of the disk stack 1 is moved up to said stack for access opening generation. In such an arrangement it is also possible for the disk stack to stop and restart, while maintaining the access opening 13. As the disk edges are supported by the roll during a standstill, an air cushion continues to exist between the individual disks, i.e., the disks do not rest upon each other, so that the conditions of flow of the disk pack are not noticeably affected if the access opening 13 is produced by means of the roll 14.

In many cases it may be advantageous to provide the roll 14 with a steel ring on the outer circumference, namely, on that edge which contacts the disk pack to generate the access opening 13. This steel ring should have only a small axial length, about 0.5 mm, and should have the same outer radius as the resilient surface of the roll 14. As a result, flexible disks 2 edges climbing up roll 14 in the resilient area may be separated more accurately from disk 2', which is not axially deflected.

An alternative embodiment of the preferred solution in accordance with the invention of the co-rotating part for producing the access opening in a rotating disk pack is described below by reference to FIGS. 3 to 6. FIG. 3 shows a schematic section of disk stack 1 and a single separator disk 31 to access the disk stack 1 circumference and which is rotatable about an axis 30. The separator disk 31 is relatively thin and has a wedge shaped outer edge, so that an acute angle of a few degrees exists between radial plane side 32 and ramp-shaped or convex side 33. Planar side 32 faces the disk 2'. The tip between planar side 32 and convex side 33 of separator disk 31 may also be rounded, as at arrow A and as shown in the enlarged showing in FIG. 4. Rounding reduces to a minimum the area of contact between flexible disks 2 and separator disk 31.

Separator disk 31 is preferably driven by a drive (not shown), so that the direction and magnitude of the circumferential speed in the area of contact with the disk stack 1 corresponds to that of the disk stack at point of contact. The drive may be effected in conjunction with the disk stack 1 drive; alternatively, a separate drive or an air impeller wheel may be used, as shown in FIG. 7. The FIG. 7 separator disk responds to the tangential air flow of the rotating stack 1 to rotate.

For producing opening 13, separator disk 31 is initially axially moved towards the desired flexible disk according to double arrow 11. Then disk stack 1 is effected in a radial direction according to arrow 12. After introduction of the tip and the outer, circumference of separator disk 31, respectively, by about 2 mm into the stack 1, separator disk 31 is shifted axially further in the direction of the arrow 11A, so that the desired access opening 13 is generated between planal side 32 and selected disk 2'. During this axial motion, the maximum access opening is greater than the axial movement along arrow 11A and, viewing in the direction of rotation of the disk stack 1, lies axially adjacent the point of insertion of the edge of the separator disk 31 into the circumference of the disk stack 1.

The flexible disks 2 deflected by separator disk 31 which rest on separator disk 31 are forced into contact by the deflection. The force causing contact is separator 31. Several flexible disks 2 may be in contact. In order to relieve forces on the outer edge of separator disk 31 while it supports the contacting flexible disks 2 and to reliably avoid contacting disk 2' by any of the deflected disks by slipping over separator disk 31, a plurality of separator disks 35 are added to separator disk 31. This addition results in a separator roll 34 having a sawtooth-shaped, outer circumference, as shown in FIG. 5. This multi-separator disk roll 34 has thinner disks arranged immediately adjacent to each other, each separator disk having individual inclined ramps suitable for supporting about 4-6 individual flexible disks 2. Each such ramp corresponds to the ramp 33 in FIG. 3, and the planar side 36 corresponds to the planar side 32 of separator disk 31 which determines selected disk 2'. Access to disk stack 1 by roll 34 and formation of the access opening 13 are affected analogously to those described in connection with separator disk 31 in FIG. 3, but, as shown in FIG. 6, an access opening 13 of greater axial extent can be obtained at the same depth of penetration. Roll 34 may also be driven in a similar manner.

Flexibility of flexible disks 2 affect separation action. That is, more rigid flexible disks necessitate a smaller depth of penetration by separate disk 31 or by roll 14 than more flexible disks. In any case, the depth of penetration by the separator is only so small that the actual recording area of the disk is never contacted.

A further embodiment of the rotating disk separator 31 is schematically represented in FIG. 6. Separator disk 40, except for the peripheral edge, is plane parallel. The edge areas have the shape of a double wedge. The access opening 13 for the head 8 is produced differently from that of the embodiments in accordance with FIGS. 3 and 5. Similar to those examples, the access movement is initially effected paraxially relative to and then radially towards the disk stack 1, with outer edge 41 of separator disk 40 penetrating the circumference of the disk stack 1 slightly, by 1 to 2 mm. Subsequently, separator disk 40 with its axis of rotation 30 tilted about a pivoting axis 42 through an angle $\tau$ (between about 5 and 10°.) The effect of this spreader disk 40 is that initially, by radially inserting the disk between the disks 2, similar to the representation in FIGS. 3 and 5, a peripheral edge of the flexible disk 2 rest on the outer edge 41, and are supported by the latter in an axially deflected position. Subsequently, as a result of the tilting movement about the pivoting axis 42, flexible disks 2 carried by the edge 41 are axially deflected from their plane of rotation, so that, viewing in the direction of rotation 19, access opening 13 then exists behind separator disk 40.

A further embodiment of the co-rotating flexible disk spreader, in particular alternatively to separator disk 40 shown in FIG. 6, is separator roll 44 of FIG. 7. A thin separator disk 45 has a unilaterally tapered outer annular edge 46 for disk selection. Thin cylinder 47 has a smaller diameter than separator disk 45. The access movement of separator roll 44 is effected analogously to that of the disk 40 in FIG. 6, and the access opening 13 is produced in the same manner. However, the deflected flexible disks 2, which in the representation of FIG. 6 are positioned on the right of the disk 40, are supported not only by the edge 48 of separator disk 45, but also rest on the cylindrical surface 49 of roll cylinder 47. To ensure flexible disks 2 are supported there, the roll 44 surface 49 similar to that of the roll 14 of FIGS. 1 and 2, may be coated with a resilient material, such as polyurethane. Air impellers 50 on cylinder 47 drive separating roll 44. Impellers 50 respond to the air pumped by rotation of disk stack 1 to rotate roll 44. This action ensures the necessary speed is obtained in the separator areas 46 and 48 for minimizing rubbing between the co-rotating separating means 44 and the co-rotating disk stack 1 in the area of contact.

While the invention has been particularly shown and described with reference to preferred embodiments thereof, it will be understood by those skilled in the art that various changes in form and details may be made therein without departing from the spirit and scope of the invention.

What is claimed is:

1. A magnetic storage apparatus having a co-rotating stack of flexible record storage disks, said disks being axially spaced apart less than a corresponding axial extent of any transducer adapted to read and record on said disks, the improvement including in combination, means for axially selectively partially separating selected ones of said flexible recording disks, said means including a circular member rotatable with respect to said stack of co-rotating flexible storage disks, means adjacent said stack of disks movably mounting said circular member for rotation at an angle less than 90° with respect to an axis of rotation of said co-rotating stack of flexible record storage disks, said circular member having a circular cylindrical configuration with a cylindrical surface exhibiting high friction characteristics and a predetermined resiliency, and said circular member being adapted for radial movement for operative and frictional engagement with a peripheral edge portion of said selected disk such that tangential velocity vectors of said circular member and said selected disk at said operative engagement are substantially identical whereby disks contacting said circular wheel move in a partial, axial direction exposing a selected disk for transducing operations.

2. The subject matter set forth in claim 1 wherein said circular member includes air vanes disposed thereon and adapted to intercept air pumped by said stack of co-rotating flexible storage disks whereby said circular member is impelled to rotate at substantially the same tangential velocity and tangential direction as said co-rotating flexible storage disks.

3. The subject matter set forth in claim 1 wherein said circular member includes a planar surface extending radially in the direction of said flexible storage disk and facing a one of said flexible storage disks to be transduced and said circular member having another surface facing away from said one surface with a convex configuration adapted to axially deflect predetermined ones of said flexible storage disks upon contact.

4. The subject matter of claim 3 wherein said circular member includes a rounded portion on said convex surface for minimizing wear.

5. The subject matter set forth in claim 3 or 4 further including a plurality of said circular members stacked for co-rotation with a planar surface of each of said circular members facing in the same direction.

6. The subject matter set forth in claim 1 wherein said circular member is a dish shape having a wedge shaped circumferential surface and said movement means adapted to move said thin disk into the envelope defined by said rotating flexible storage disks.

* * * * *